July 2, 1963 T. R. BEAMISH 3,095,846
AIRCRAFT FLOAT
Filed July 19, 1961 2 Sheets-Sheet 1
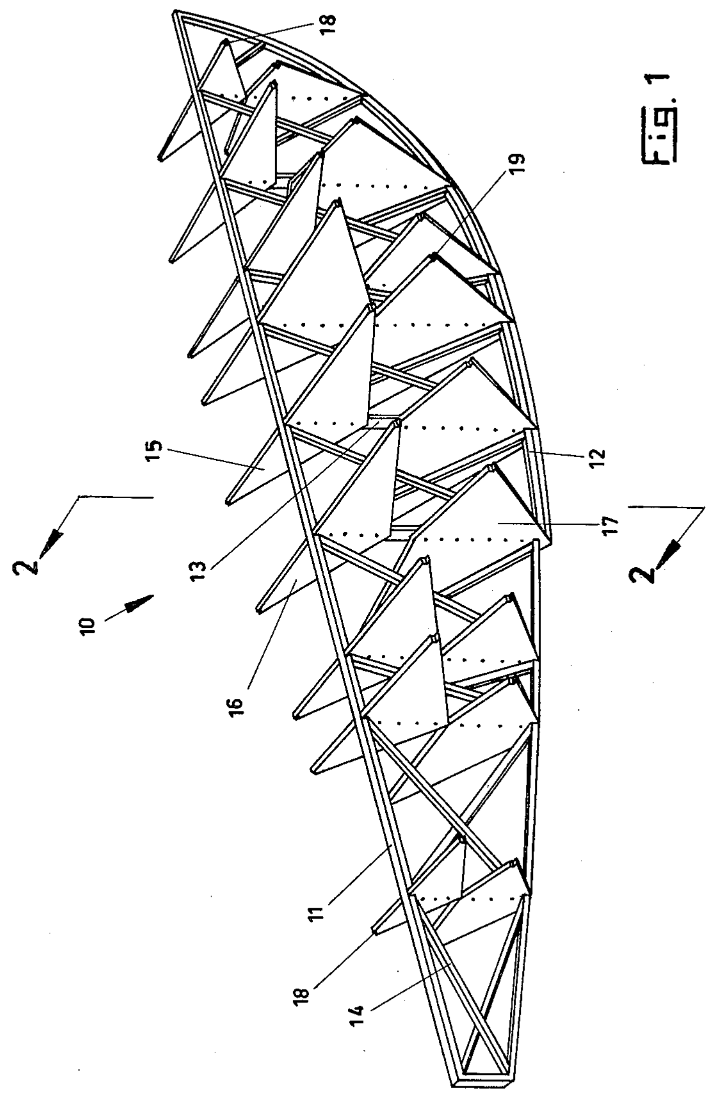
INVENTOR.
Thomas R. Beamish

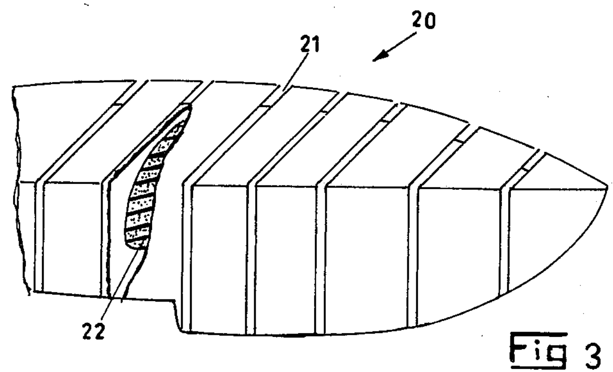
Fig 3
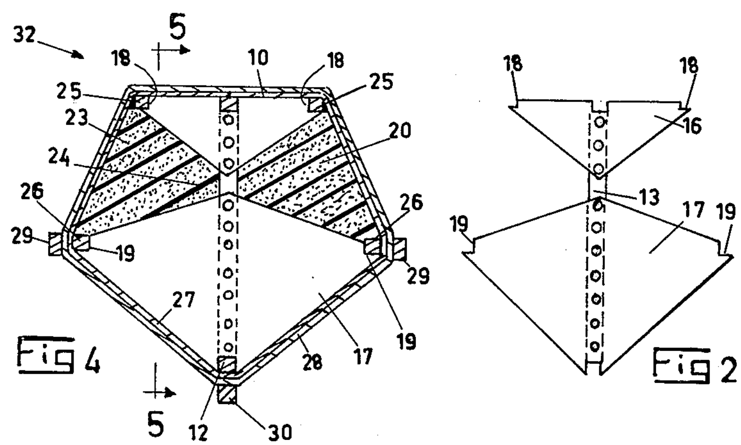
Fig 4
Fig 2
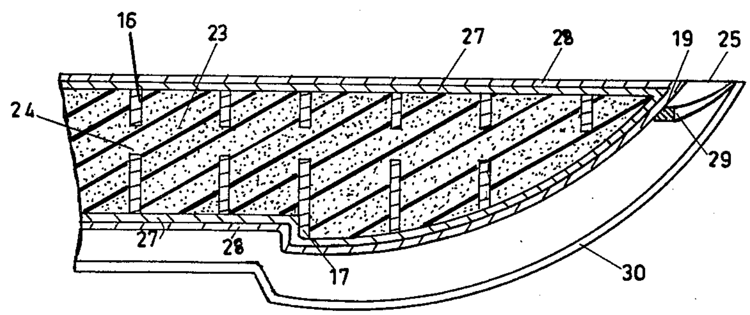
Fig 5
INVENTOR.
Thomas R. Beamish United States Patent Office 3,095,846

Patented July 2, 1963

3,095,846

AIRCRAFT FLOAT

Thomas R. Beamish, Streetsville, Ontario, Canada (% Canadian Research and Development Foundation, 1434 Queen St. W., Toronto 3, Ontario, Canada)

Filed July 19, 1961, Ser. No. 125,137
3 Claims. (Cl. 114—66.5)

This invention relates to improvements in pontoons and the like and, more particularly, to improvements in aircraft floats.

It is conventional practice to provide amphibious aircraft or seaplanes with floats comprising an interior framework, normally of an aluminum alloy, covered with a stressed skin, also of aluminum alloy. The main safety feature specified in such a float is that it should be divided into at least four separate water tight compartments. The disadvantages of such a float are that they are comparatively heavy even though manufactured of aluminum alloy and their construction requires specialized type of rivetting and extra care in order to provide water tight seams. Furthermore, floats of this type are inflexible and even if only one of the water tight compartments becomes punctured the float loses much of its buoyancy and the aircraft, although remaining afloat, develops a pronounced list, becoming difficult to control during taxiing and, most probably, unable to take off. Another disadvantage lies in the fact that these particular floats are expensive and, therefore, beyond the means of many owners of light aircraft who otherwise would convert their aircraft to float planes.

It is an object of this invention to provide an aircraft float which utilizes light structural members and fabric skin thereby rendering the float light in weight.

It is another object of this invention to provide an aircraft float which is substantially unsinkable due to the fact that the interior is filled with a cellular foam comprising an extremely large number of independent watertight cavities.

It is another object of this invention to provide an aircraft float having a stressed but flexible outer skin which adds to the strength of the framework, protects the foam and also contributes to the water tightness of the float.

It is still another object of the present invention to provide an aircraft float which may be quickly and easily repaired by unskilled personnel should it sustain any damage, the repair kit therefor occupying a minimum amount of space within the aircraft.

It is a further object of this invention to provide an aircraft float which will retain substantially maximum buoyancy even though punctured.

It is yet another object of this invention to provide an aircraft float of a simple construction which does not require riveting or the like and does not require highly specialized skills for the construction thereof.

It is yet another object of this invention to provide an aircraft float which is relatively inexpensive to manufacture.

It is still another object of this invention to provide an aircraft float which will absorb all landing shocks through the centre girder incorporated therein and may, if necessary, alight upon an airfield and, under normal circumstances, not sustain damage to the floats.

It is yet another object of this invention to provide an aircraft float which will comply with the United States National Aircraft Standards Committee Specification N.A.S. 807.

These and other objects and features of this invention will become apparent when taken in conjunction with the accompanying drawings in which:

FIG. 1 is a perspective view of the centre truss beam and its associated formers which comprise the framework for an aircraft float embodying this invention.

FIG. 2 is a sectional end elevation of the truss beam and a former assembly, taken on the line 2—2 of FIG. 1, illustrating particularly the configuration of the formers.

FIG. 3 is a part cut away perspective view of a block of foamed material utilized in the construction of the present float, shaped and slotted in readiness for assembly to one side of the framework illustrated in FIG. 1.

FIG. 4 is a sectional end elevation of an aircraft float embodying the truss beam and formers as illustrated in FIGS. 1 and 2, illustrating particularly the foam filling and the method of attaching the outer skin.

FIG. 5 is a fractional sectional side elevation of an aircraft float embodying the present invention taken on the line 5—5 of FIG. 4, illustrating particularly the continuity of the foam block within the float structure.

Referring to FIG. 1, a truss beam 10 comprising an upper longitudinal member 11 and a keel strip 12 held in spaced apart relationship by a plurality of substantially vertical struts 13, is cross braced by a plurality of cross bracing members 14 in a conventional manner. Keel strip 12 is stepped substantially midway along its length in a conventional manner.

A plurality of former assemblies 15, each comprising an upper cantilever plate 16 and a lower cantilever plate 17 extend transversely of and symmetrically about truss beam 10 at each strut 13, said upper cantilever plate 16 being substantially triangular in plan view and said lower cantilever plate 17 quadrilateral in plan view.

Referring also to FIG. 2, it will be noted that upper cantilever plate 16 is an inverted isosceles triangle equally disposed about strut 13, upon which it is mounted by conventional means such as screws and gluing, its oppositely located, outermost corners 18—18 being suitably recessed to accommodate longitudinal shear strakes to be hereinafter described. Lower cantilever plate 17 is similarly equally disposed about strut 13 and attached thereto in a manner similar to upper cantilever plate 16 about its shorter diagonal centre line, its oppositely located corners 19—19 being cut away to receive inner chine strips to be hereinafter described. It will be noted that corners 19—19 of lower cantilever plate 17 extend outwardly of strut 13 for a greater distance than corners 18—18 of upper plate 16.

Referring to FIG. 3, a block 20 of expanded polystyrene foom or the like has been shaped to the configuration of half a float split vertically longitudinally and a plurality of transverse slots 21 have been formed therein to permit the assembly thereof upon former assemblies 15 as illustrated in FIG. 1. It will be noted that during the formation of slots 21 block 20 has not been completely traversed thereby but, by assuming the shape of upper and lower cantilever plates 16 and 17 respectively, a centre core 22 remains uncut.

It may be noted that a standard, hot wire method of cutting block 20 is utilized in the shaping of block 20 and in the formation of slots 21.

Referring to FIG. 4, block 20 as shown in FIG. 3 is illustrated assembled to beam 10, its centre core 22 only being visible. A similar block 23 is assembled on the opposite side of beam 10 in a similar manner its centre core 24 only being visible also.

Referring to FIGS. 3, 4 and 5, it will be noted that after assembly of blocks 20 and 23 to beam 10 the external longitudinal members are fitted including two oppositely located shear strakes 25—25 which are accommodated in the cut-out corners 18—18 of upper cantilever plate 16 as previously described; and two oppositely located, inner chine strips 26—26 which are located longitudinally in the cut-out corners 19—19 of lower cantilever plate 17 as illustrated in FIG. 2.

It will be noted that at this stage, shear strakes 25 and chine strips 26 are instrumental in retaining blocks 20 and 23 within the framework of beam 10. In addition a suitable adhesive may be utilized to bond blocks 20 and 23 to their contiguous sides of former assemblies 15.

Thereafter the assembly as heretofore described is completely covered in an underlay 27 of reinforcing material and an outer layer 28 is adapted to encase and adhere to underlay 27.

Underlay 27 comprises a fairly open weave material such as glass cloth, which has been saturated with an epoxy resin and its complementary hardener prior to application to blocks 20 and 23 and beam 10.

It should be noted that by applying a ready treated cloth to the assembly, an even spread of resin is ensured and, furthermore, only the required amount of resin and hardener to achieve the bond is applied and the outermost cells of blocks 23 and 20 do not become filled with resin as they would if the cloth were treated after assembly.

It should also be noted that underlay 27 adheres both to the exterior of blocks 20 and 23 and to the outermost edges of upper cantilever plate 16 and lower cantilever plate 17, as well as to the exterior of shear strakes 25 and chine strips 26. Furthermore, it also adheres to the outer surface of upper member 11 and to the lower surface of keep strip 12 of beam 10 thereby uniting all of the aforementioned members in a stressed skin type of structure.

Outer layer 28 comprises a glass cloth similarly impregnated with an epoxy resin and applied in a similar manner. In this way, extreme structural strength is imparted to beam 10 and blocks 20 and 23 thereby providing a unified construction and any load applied to outer layer 28 is transferred through blocks 20 and 23 and former assemblies to truss beam 10.

It should also be noted that the use of an epoxy resin and hardener provides an extremely hard outer shell which is impervious to water and substantially shatter proof.

An outer chine strip 29 is coextensive with each chine strip 26 and is adapted to protect outer layer 28 from rubbing wear and to assist in breaking any vacuum caused between the bottom surfaces of outer layer 28 and the body of water on which it might be floating.

Finally, a keel 30, coextensive with keel strip 12, is added to protect outer layer 28 from abrasions or the like and to ward off floating objects.

The completed float assembly 32 as herein described is attached to an aircraft undercarriage in any conventional manner and it may be seen that landing shocks sustained by outer layer 28 is transferred both through blocks 20 and 23 and, principally, through former assemblies 15 to beam 10 and thence to the aircraft.

The epoxy resin coating applied to outer layer 28 may include a colouring and filling material such as titanium dioxide pigment which, in this case, will give the exterior of the float an opaque white appearance.

Due to the cellular composition of foam blocks 20 and 23 any water which may gain access to the interior of float assembly 32 due to a rupturing of both outer layer 28 and underlay 27, will be confined to the hole and, will be unable to spread throughout the remainder of the float. Thus even comparatively large holes formed therein will destroy only a small percentage of the buoyancy of the float and permit operation of the aircraft in a normal manner. Furthermore, the repair may be effected quickly and easily by insertion of a foam plug within the hole so caused, and layers 27 and 28 may be patched utilizing an epoxy resin and hardener, it becoming completely bonded to the remainder of the exterior. An added advantage to this repair method is that the components required to carry out a repair of this nature are small, light, and may be easily carried within an aircraft and used by an unskilled person.

It should be noted that former assemblies 15 vary in size in order to determine the external contours of the float. They may also vary slightly in shape in order to provide heavier members adjacent the points of attachment between the float and the aircraft struts and lighter members where there is less stress and strain.

Although the foregoing description relates principally to the utilization of wood in the construction of the beam 10 and former assemblies 15, it should be understood that the said beam and former assemblies may be made from aluminum alloy or the like, in which case conventional methods, such as rivetting or welding, may be adopted in the joining of the formers to the beam. The remainder of the construction however, is as described and it should be explained that epoxy resin bonds equally effectively with metal as with wood and therefore there is no loss in efficiency.

The general design of the individual parts of the invention as explained above may be varied according to the requirements in regards to manufacture and production thereof, while still remaining within the spirit and principle of the invention, without prejudicing the novelty thereof.

The embodiments of this invention in which an exclusive property or privilege is claimed are defined as follows:

1. An aircraft float including a beam assembly having an upper longitudinal member and a keel strip in vertical, spaced apart alignment; a plurality of former assemblies attached to said beam assembly and extending outwardly therefrom substantially at right angles thereto; a plurality of shear strakes and inner chine strips attached to said former assemblies; a block of cellular foam material occupying the space defined by said upper member, said keel strip, said shear strakes and said chine strips; water tight covering means closely enveloping said block, said upper member, said keel strip, said shear strakes and said chine strips and adhesively attached thereto; each said former assembly including an upper cantilevered plate and a lower cantilevered plate symmetrically disposed about said beam assembly; said upper cantilevered plate being substantially triangular and having two oppositely located corners cut away to accommodate said shear strakes; said lower cantilevered plate being substantially quadrilateral and having two diagonally opposite corners cut away to accommodate said inner chine strips.

2. An aircraft float including a truss beam having a longitudinal upper member; a keel strip in vertical, spaced apart alignment therewith; vertical struts extending between said upper member and said keel strip; cross bracing members extending between upper and lower ends of adjacent vertical struts; a plurality of former assemblies attached to said vertical struts and extending symmetrically outwardly therefrom on each side thereof at substantially right angles to said truss beam; said former assembly including an upper, triangular cantilevered plate and a lower quadrilateral cantilevered plate; oppositely extending corners of said upper cantilevered plate having cut outs therein and oppositely extending corners of said lower cantilevered plate having cut outs therein; two oppositely located shear strakes extending the length of said float each accommodated in said cut outs in said corners of said upper cantilevered plates; two oppositely located inner chine strips extending the length of said float and accommodated in said cut outs in said corners of said lower cantilevered plates; a block of cellular foamed, expanded polystyrene occupying the space defined by said upper member, said keel strip, said shear strakes and said chine strips; a watertight covering including an underlayer of glass cloth adhesively attached to said foam and said upper member, said keel strip, said shear strakes and said chine strips; and an outer layer of glass cloth adhesively attached to said underlay; epoxy resin and hardener impregnating said underlay and said outer layer as an adhesive and a hardener thereof; two outer chine strips coextensive with said inner chine strips and substantially contiguous therewith, said watertight covering being interposed therebetween; and a keel coextensive and substantially contiguous with said keel strip, said watertight covering being interposed therebetween.

3. An aircraft float including a beam assembly having an upper longitudinal member and a keel strip in vertical, spaced apart alignment; a plurality of former assemblies attached to said beam assembly and extending outwardly therefrom substantially at right angles thereto; a plurality of shear strakes and inner chine strips attached to said former assemblies; a block of cellular foam material occupying the space defined by said upper member, said keel strip, said shear strakes and said chine strips, watertight covering means closely enveloping said block, said upper member, said keel strip, said shear strakes and said chine strips and adhesively attached thereto; a plurality of outer chine strips, coextensive with said inner chine strips and substantially contiguous therewith, said watertight covering means being interposed therebetween, and a keel coextensive and contiguous with said keel strip, said watertight covering means being interposed therebetween; each said former assembly including an upper cantilevered plate and a lower cantilevered plate symmetrically disposed about said beam assembly; said upper cantilevered plate being substantially triangular and having two oppositely located corners cut away to accommodate said shear strakes; said lower cantilevered plate being substantially quadrilateral and having two diagonally opposite corners cut away to accommodate said inner chine strips.

References Cited in the file of this patent

UNITED STATES PATENTS

| | | |
|---|---|---|
| 1,740,846 | Van Dusen | Dec. 24, 1929 |
| 2,417,508 | Leyde | Mar. 18, 1947 |
| 2,909,791 | Malary | Oct. 27, 1959 |

FOREIGN PATENTS

| | | |
|---|---|---|
| 765,565 | France | Mar. 26, 1934 |
| 1,239,900 | France | July 18, 1960 |